US012610338B1

(12) United States Patent
Whittington et al.

(10) Patent No.: US 12,610,338 B1
(45) Date of Patent: Apr. 21, 2026

(54) INTERACTIVE SYSTEMS AND METHODS FOR EVENT RESPONSE

(71) Applicant: United Services Automobile Association (USAA), San Antonio, TX (US)

(72) Inventors: Paula Ann Whittington, Helotes, TX (US); Kelly Q. Baker, San Antonio, TX (US); Ashley Blake, San Antonio, TX (US); Donette Rae Williams, Boerne, TX (US); Kevin Lamar White, San Antonio, TX (US); Seth E. Ethington, McKinney, TX (US); Bradly Jay Billman, Celina, TX (US); Teodoro Mora, Jr., Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 277 days.

(21) Appl. No.: 18/210,924

(22) Filed: Jun. 16, 2023

(51) Int. Cl.
| | |
|---|---|
| *H04W 64/00* | (2009.01) |
| *G06Q 10/083* | (2024.01) |
| *G06Q 40/08* | (2012.01) |
| *G06V 20/56* | (2022.01) |
| *G08B 25/10* | (2006.01) |

(52) U.S. Cl.
CPC .......... *H04W 64/00* (2013.01); *G06Q 10/083* (2013.01); *G06Q 40/08* (2013.01); *G06V 20/56* (2022.01); *G08B 25/10* (2013.01)

(58) Field of Classification Search
CPC ...... G06V 20/56; G06Q 10/083; G06Q 40/08; G08B 25/10
USPC ........................................................ 455/404.1
See application file for complete search history.

(56) References Cited

U.S. PATENT DOCUMENTS

| | | | |
|---|---|---|---|
| 9,905,133 B1 * | 2/2018 | Kumar ................... | G07C 5/008 |
| 12,361,367 B1 | 7/2025 | Medina, III et al. | |
| 2017/0344707 A1 * | 11/2017 | Patel ...................... | G08G 1/202 |
| 2024/0163419 A1 * | 5/2024 | Watkins ................ | G06T 7/0002 |
| 2024/0412856 A1 * | 12/2024 | Mensch ................. | G06Q 10/10 |

OTHER PUBLICATIONS

U.S. Appl. No. 17/899,742, filed Aug. 31, 2022, Reynaldo Medina III.

* cited by examiner

*Primary Examiner* — Maria El-Zoobi
(74) *Attorney, Agent, or Firm* — Fletcher Yoder, P.C.

(57) ABSTRACT

An interactive response system includes one or more processors configured to identify occurrence of an event in a geographic area. Further, in response to identifying the occurrence of the event in the geographic area, the one or more processors are configured to instruct one or more vehicles to travel to a location in the geographic area and operate one or more speakers and one or more microphones on the one or more vehicles to carry out interactive communications with one or more users in the geographic area.

20 Claims, 5 Drawing Sheets

INTERACTIVE SYSTEMS AND METHODS FOR EVENT RESPONSE

BACKGROUND

The present disclosure relates generally to vehicle network systems and methods, and more particularly, to vehicle network systems and methods that operate teams of vehicles to detect and/or respond to events (e.g., weather events, social events, crime events, vehicle crash events, unusual activity) in a geographic area (e.g., a neighborhood, a parking lot).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

During events (e.g., flooding, winter storm, earthquake), residents who live within certain areas affected by the events may be unable to travel to receive aid and/or obtain basic supplies (e.g., food, water, first aid supplies) due to road conditions or various other reasons. Further, response crews (e.g., human response crews) may be unable to reach certain areas to provide the aid and/or the basic supplies. This may lead to delays in residents receiving the aid and/or the basic supplies they may need during and/or after the event. Additionally, residents may experience poor and/or no long-range communication service (e.g., Internet or cellular service, such as 5G) during and/or after the event. This may prevent residents them from using their cellular devices and/or other user devices to request the aid and/or the basic supplies, and may further lead to delays in the residents communicating with providers (e.g., Emergency Medical Services [EMS], Fire Departments) to communicate that the aid and/or the basic supplies are needed at certain locations.

BRIEF DESCRIPTION OF THE DRAWINGS

Various aspects of this disclosure may be better understood upon reading the following detailed description and upon reference to the drawings in which.

DETAILED DESCRIPTION

Figure 1:
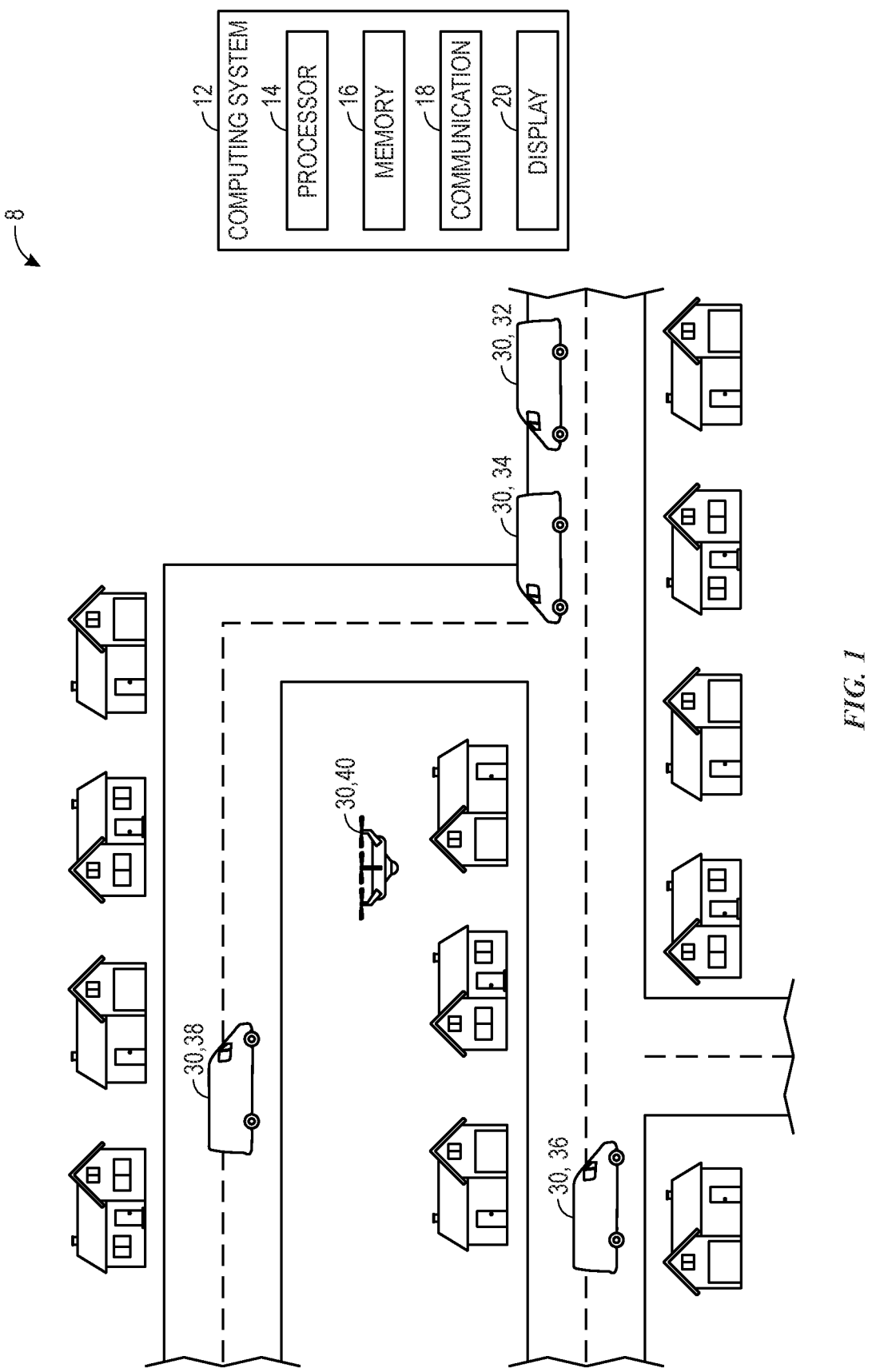
FIG. 1 illustrates an interactive response system for a geographic area, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure the articles "a," "an," "the," and "said" are intended to mean that there are one or more of the elements. The terms "comprising," "including," and "having" are intended to be inclusive and mean that there may be additional elements other than the listed elements. It should be noted that the terms "activity level" and "state" may be used interchangeably herein.

During an event (e.g., an emergency event) in a geographic area, at least some residents in the geographic area may be unable to obtain supplies and/or communicate with providers (e.g., emergency response crews, insurance providers, banking institutions) due to conditions in the geographic area. For example, the residents may be unable to travel to obtain supplies and/or communicate with providers due to damage to vehicles, damage to buildings, poor road conditions, poor cellular or other network connections, or the like, in the geographic area being impacted by the event. Additionally, the conditions may make it difficult for representatives (e.g., human representatives) of the providers to efficiently travel to and/or throughout the geographic area being impacted by the event. Indeed, in some cases, the representatives may not be able to travel to and/or throughout the geographic area being impacted by the event.

It is now recognized that various advantages may be gained by utilizing an interactive response system (e.g., a vehicle response system) that includes one or more response vehicles to respond to events. For example, the one or more response vehicles may be configured to travel to the geographic area in response to occurrence of an event and to provide information to users, receive information from users, provide supplies to users, and so forth. The one or more response vehicles may include features that facilitate interactions with the users, such as speakers to output sounds, microphones to detect sounds, cameras to capture images, projectors and/or display screens to display images (e.g., imagery), containers to store supplies, delivery systems to dispense supplies, memory (e.g., electronic memory or storage) to store data, processing components (e.g., electronic processing components) to process data, and/or communication devices to communicate via a network. In some embodiments, the one or more response vehicles may include features that provide customized interactions for the users. For example, the one or more response vehicles may include adjustable exterior surfaces (e.g., via imagery and/or color-changing paint on the adjustable exterior surfaces) and/or present images of user-selected avatars to provide the customized interactions for the users. In this way, the interactive response system may provide efficient and/or customized service (e.g., sharing information, initiating damage claims, providing supplies) to the users in response to the occurrence of the event.

With the foregoing in mind, FIG. 1 illustrates an interactive response system 8 in a geographic area, in accordance with embodiments described herein. The interactive response system 8 may include a computing system 12, which may include any suitable computing device, such as a general-purpose personal computer, a laptop computer, a tablet computer, a mobile computer, a server, or the like. The computing system 12 may include various types of components that assist the computing system 12 in performing various operations described herein. For example, the computing system 12 may include a processor 14, a memory 16, a communication device 18, and/or a display 20.

The processor 14 may be any type of computer processor or microprocessor capable of executing computer-executable code. The memory 16 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform various techniques disclosed herein. The memory 16 may represent non-transitory computer-readable media (e.g., any suitable form of memory or storage). It should be noted that non-transitory merely indicates that the media is tangible and not a signal. Data (e.g., event information, vehicle information, user information, supplies information, geographic area information, route information, thresholds) may be stored in one or more databases, which may be accessible to the computing system 12 and/or may be part of the computing system 12 (e.g., within the memory 16).

The communication device 18 may enable the computing system 12 to communicate with other systems (e.g., via a network, such as the Internet; capable of transmitting radio frequency waves). The display 20 may operate as a human machine interface (HMI) to depict visualizations associated with software or executable code being processed by the processor 14. In one embodiment, the display 20 may be a touch display capable of receiving inputs from a user of the computing system 12. The display 20 may be any suitable type of display, such as a liquid crystal display (LCD), plasma display, or an organic light emitting diode (OLED) display, for example. It should be noted that the components described above with regard to the computing system 12 are examples and the computing system 12 may include additional or fewer components. In some embodiments, the computing system 12 may be a distributed computing system that includes multiple processors 14 (e.g., including one or more cloud computing systems having multiple processors 14).

The interactive response system 8 includes one or more vehicles 30. To facilitate discussion, the vehicle network system 8 of FIG. 1 includes a first vehicle 32, a second vehicle 34, a third vehicle 36, a fourth vehicle 38, and a fifth vehicle 40. As shown, the one or more vehicles 30 may include one or more ground vehicles (e.g., with wheels or tracks that contact ground during travel; cars, trucks, trains) and/or one or more aerial vehicles (e.g., that fly or move through the air during travel; drones, airplanes, helicopters). The one or more vehicles 30 may additionally or alternatively include any of a variety of other types of vehicles, including one or more water vehicles (e.g., boats). Further, some or all of the one or more vehicles 30 may be autonomous vehicles (e.g., self-driving vehicles; travel without real-time or substantially real-time inputs from human operators) and/or remotely-controlled vehicles (e.g., travel based on real-time or substantially real-time inputs from human operators located remotely from the remotely-controlled vehicles).

The one or more vehicles 30 may include communication devices that enable the one or more vehicles 30 to communicate directly with one another and/or indirectly with one another via the computing system 12. In any case, the interactive response system 8 may initiate communication with the one or more vehicles 30, activate the one or more vehicles 30 for interactions, and/or instruct the one or more vehicles 30 to travel to (or move within) the geographic area in response to occurrence of an event (e.g., emergency event) in the geographic area. The one or more vehicles 30 and/or the computing system 12 may receive an indication of the occurrence of the event in the geographic area from any of a variety of sources, such as data from one or more sensors 42 on the one or more vehicles 30 or other structures 44 in the geographic area, data from one or more user devices 46 (e.g., input by users), data from one or more external data sources (e.g., weather reports, news reports, social media), and so forth.

The one or more vehicles 30 may include one or more vehicles owned by or otherwise associated with respective users (e.g., individual users; residents of the geographic area). Additionally or alternatively, the one or more vehicles 30 may include one or more vehicles owned by or otherwise associated with a provider(s) (e.g., emergency response crew(s), insurance provider(s), banking institution(s)).

In some embodiments, the one or more vehicles 30 may include some or all of the vehicles (e.g., autonomous vehicles; vehicles with interactive features) present in and/or nearby the geographic area during the occurrence of the event in the geographic area (e.g., during the event and/or at a time of receipt of the indication of the occurrence of the event in the geographic area; in and/or within a range, such as 1, 5, 10, or more kilometers, of the geographic area). Additionally or alternatively, the one or more vehicles 30 may include all vehicles that qualify for participation in the interactive response system 8, such as all vehicles that are registered with the provider(s) (e.g., insured by the insurance provider(s); via request by the users), all vehicles that are owned by or otherwise associated with the provider(s), all autonomous vehicles, and/or all vehicles with interactive features.

In some embodiments, the users that register their vehicles to participate in the interactive response system 8 may receive a benefit, such as a discount on insurance for their vehicles (e.g., a reduced premium and/or deductible), a discount on insurance for other assets (e.g., home owners insurance), a coupon to apply to maintenance or repair costs for their vehicles, additional cash back on payment cards, and so forth. In some embodiments, the users that register their vehicles to participate in the interactive response system 8 may receive kits (e.g., electronics package) to retrofit to their vehicles to enable their vehicles to carry out techniques disclosed herein. For example, each of the kits may include a speaker, a microphone, a projector and/or a display, and so forth to facilitate interactions with the users during and/or after the occurrence of the event.

In operation, the interactive response system 8 may receive the indication of the occurrence of the event. The indication may be received by at least one of the one or more vehicles 30 and/or by the computing system 12. The one or more vehicles 30 and/or the computing system 12 may then initiate an interactive response (e.g., interactive response process). For example, the computing system 12 may identify that the third vehicle 36 and the fourth vehicle 38 are owned by respective users, are present in the geographic area, and qualify to participate in the interactive response system 8. Additionally, the computing system 12 may identify that the first vehicle 32, the second vehicle 34, and the fifth vehicle 40 are located nearby and/or are otherwise capable of traveling to the geographic area. For example, the first vehicle 32 and the second vehicle 34 may be all-terrain ground vehicles, and the fifth vehicle 40 may be an aerial vehicle (e.g., drone). The computing system 12 may communicate with the one or more vehicles 30, such as to provide instructions to enable local computing systems on the one or more vehicles 30 to control the one or more vehicles 30 travel to respective designated locations (e.g., different locations to spread out across the geographic area; one or more accessible locations, such as community centers or parking lots, in the geographic area).

It should be appreciated that the communications may be carried out in any of a variety of manners. For example, if certain networks are unavailable (e.g., cellular and/or Internet; due to the event), then certain instructions may be stored on at least one of the one or more vehicles 30, such as one of the first vehicle 32, the second vehicle 34, and/or the fifth vehicle 40 that travel to the geographic area in response to the occurrence of the event (e.g., stored prior to the travel). Then, the at least one of the one or more vehicles 30 may carry out operations according to the instructions and/or communicate the instructions to the other vehicles 30, such as the third vehicle 36 and the fourth vehicle 38. In this way, the interactive response system 8 may coordinate operation of the one or more vehicles 30 to respond to the event.

Figure 2:
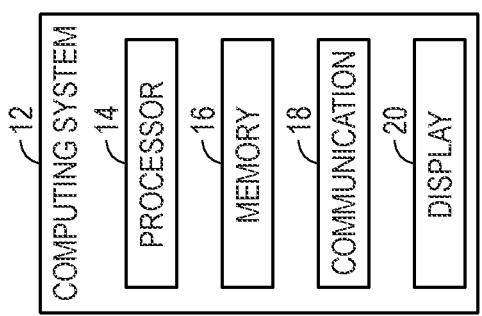
FIG. 2 illustrates a response vehicle that may be part of the interactive response system of FIG. 1, in accordance with embodiments described herein.
Figure 2:
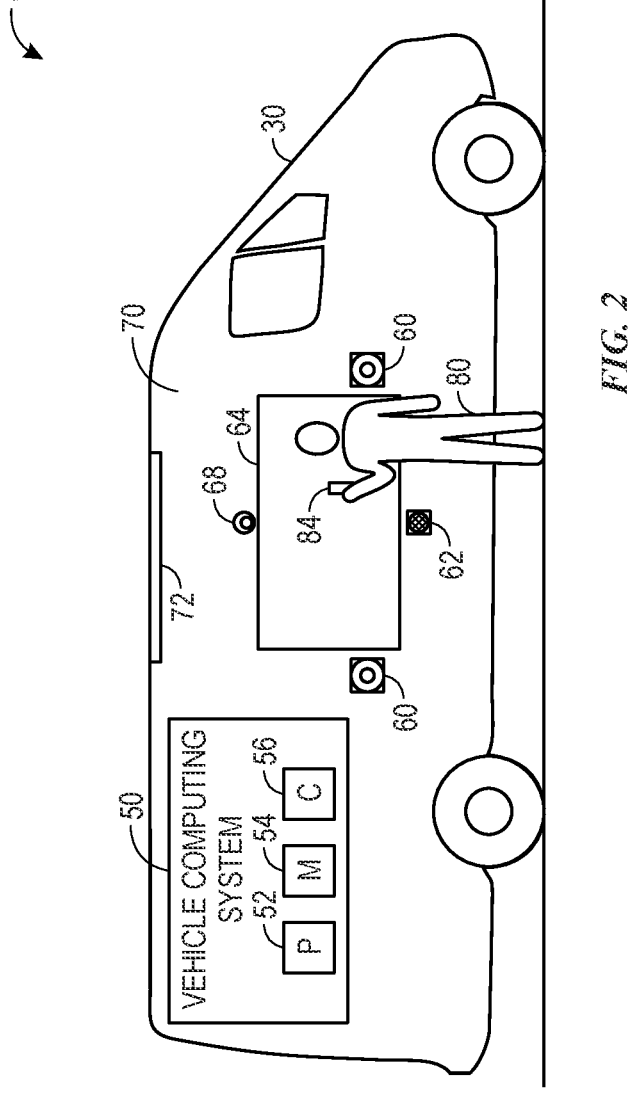

FIG. 2 illustrates an embodiment of one of the one or more vehicles 30 that may be utilized in the interactive response system 8. As shown, the vehicle 30 includes a vehicle computing system 50 with a processor 52, a memory 54, and a communication device 56. The vehicle computing system 50 may also include or be communicatively coupled to one or more speakers 60, one or more microphones 62, one or more display devices 64 (e.g., one or more projectors and/or one or more display screens), one or more sensors 68 (e.g., one or more cameras), and/or other devices (e.g., to receive inputs and/or to provide outputs).

In some embodiments, the vehicle computing system 50 may include or be communicatively coupled to an adjustable exterior surface 70 (e.g., transforming exterior surface), which may be configured to change appearance (e.g., color, text, shape). For example, the adjustable exterior surface 70 may include at least one of the one or more display devices 64 (e.g., a screen that is backlit via the one or more projectors and/or more display screens that display imagery). As another example, the adjustable exterior surface 70 may include color-changing paint, such as paint that changes colors based on an electric field (e.g., microcapsules that include negatively charged pigments in a first color and positively charged pigments in a second color, and application of the electric field causes either the pigments in the first color or the pigments in the second color to collect and be visible along the adjustable exterior surface 70). As another example, the adjustable exterior surface 70 may include adjustable structures 72 along the adjustable exterior surface 70, such as spoilers, signs, and so forth, that may be driven (e.g., via actuators) to be either not visible or visible along the adjustable exterior surface 70. Indeed, it is envisioned that any of a variety of techniques may be employed to change an appearance of the vehicle 30.

As discussed with reference to FIG. 1, the vehicle 30 may be identified as being within the geographic area (e.g., based on global positioning coordinates) and/or may be sent to the geographic area in response to the occurrence of the event. The vehicle 30 may be selected to participate in the interactive response system 8 alone or as a team with one or more other vehicles. In some cases, the vehicle 30 may be selected to participate in the interactive response system 8 because of its location, its registration/qualification to participate in the interactive response system 8, and/or particular features of the vehicle 30 (e.g., capable of all-terrain or aerial travel, the adjustable exterior surface 70, storage containers on-board the vehicle 30). For example, if the geographic area includes mountainous terrain that has experienced a snowstorm event, the interactive response system 8 may select the vehicle 30 (e.g., from a fleet of available vehicles) that has snow tires, is capable of all-terrain travel, and has a fixed exterior surface or the adjustable exterior surface 70 that will be easily visible in presence of snow (e.g., color other than white).

The vehicle 30 may be configured to provide information to users, receive information from users, provide supplies to users, and so forth. For example, a user 80 may approach the vehicle 30. The vehicle 30 may detect the user 80 via the one or more sensors 68. In some cases, the one or more sensors 68 include one or more cameras configured to capture images of the user 80 and then transmit the images of the user 80 to the processor 52 of the vehicle computing system 50 and/or to the processor 14 of the computing system 12. The processor 52 and/or the processor 14 may process the images (e.g., facial recognition techniques) to identify the user 80.

Then, the processor 52 and/or the processor 14 may access user information for the user 80 in one or more databases in the memory 54 and/or the memory 16. For example, the user information may include a name of the user 80, an address of the user 80, an insurance provider for the user 80, an insurance policy for the user 80, a banking institution for the user 80, an account balance of a bank account of the user 80, preferences of the user 80, medications taken by the user 80, and/or other characteristics for the user 80. The user information may also link to household members associated with the user 80, as well as respective information for the household members. The preferences of the user 80 may include a preferred supply list for the user 80, which may be entered by the user 80 during a registration process (e.g., upon enrollment to obtain an insurance policy; to request participation in the interactive response system 8). For example, the user 80 may indicate that the user 80 would like blankets and medication during a snowstorm event, and tarps and medication during a hurricane event.

In some embodiments, the interactive response system 8 may communicate or interface with a user device 84 (e.g., mobile phone, smart watch) of the user 80. For example, the communication device 56 of the vehicle 30 may communicate with the user device 84 via short range communications (e.g., Bluetooth or near-field communication [NFC]). The one or more sensors 68 of the vehicle 30 may be configured to read or scan a unique identifier (e.g., barcode, quick response code, alphanumerical code, identifier stored in radiofrequency identification tags) from the user device 84, which may enable the processor 52 of the vehicle computing system 50 and/or the processor 14 of the computing system 12 to access the user information of the user 80 (e.g., via lookup tables that correlate the unique identifier to the user information of the user 80).

The interactive response system 8 may utilize the user information to facilitate interactions with the user 80. In some embodiments, the interactive response system 8 may carry out a process to provide information (e.g., about the event, available resources) to the user 80 via the one or more speakers 60 and/or the one or more display devices 64 of the vehicle 30. The interactive response system 8 may receive information (e.g., about the event, needed supplies, the user information) from the user 80 via the one or more microphones 62 and/or via inputs on the one or more display devices 64 (e.g., touchscreen) of the vehicle 30. In some embodiments, the interactive response system 8 may utilize artificial intelligence (AI) (e.g., machine learning) to assess behavior of the user 80 and/or needs of the user 80, as well as to control outputs to interact with the user 80. For example, the interactive response system 8 may utilize AI algorithms to assess imagery and/or spoken inputs from the user 80 to determine that the user 80 is upset or distressed, and the interactive response system 8 may communicate with a tone, cadence, phrases, and/or terms that are intended to sooth the user 80. As another example, the interactive response system 8 may utilize AI algorithms to assess imagery and/or spoken inputs from the user 80 to determine that the user 80 is hurried or rushed, and the interactive response system 8 may communicate with a tone, cadence, phrases, and/or terms that are intended to expedite the interaction with the user 80. Further, the interactive response system 8 may utilize the AI algorithms to carry out a conversational interaction (e.g., to emulate a natural conversation between two humans) with the user 80. The interactive response system 8 may utilize the user information to pre-populate forms, initiate insurance claims, initiate requests for supplies, and so forth.

Figure 3:
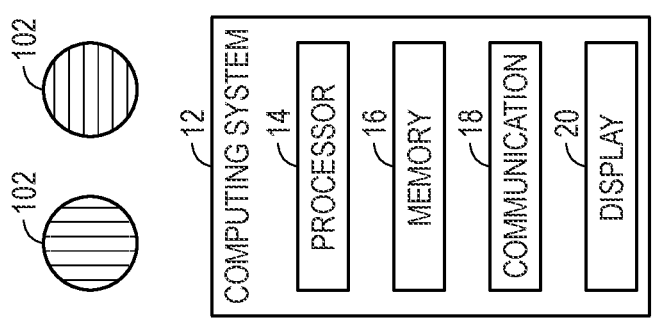
FIG. 3 illustrates a response vehicle that may be part of the interactive response system of FIG. 1, wherein the response vehicle includes an adjustable exterior surface, in accordance with embodiments described herein.
Figure 3:
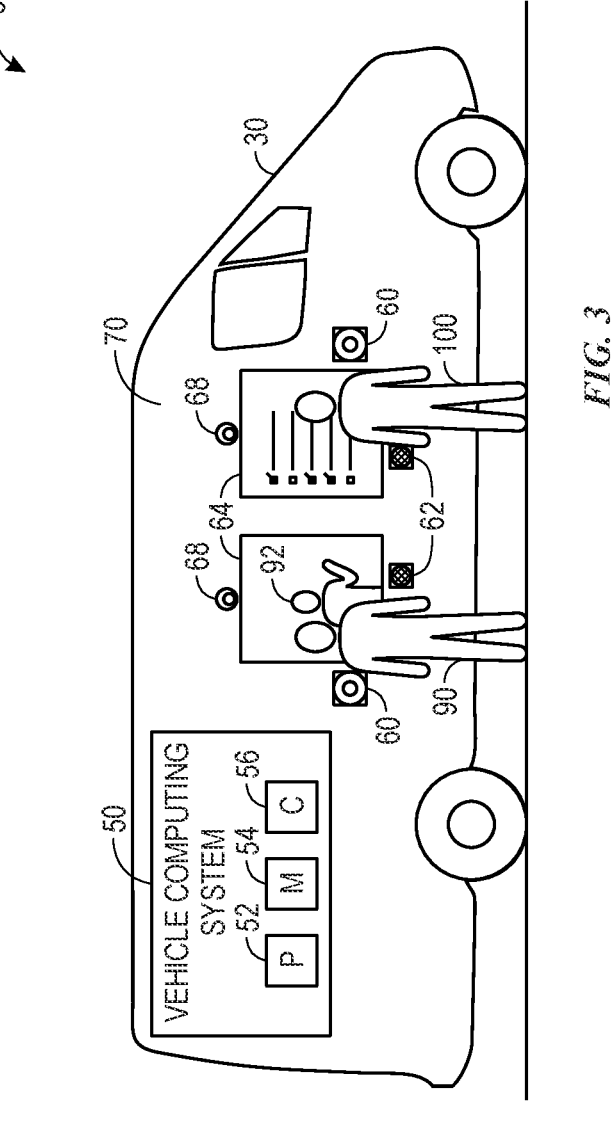

FIG. 3 illustrates an embodiment of one of the one or more vehicles 30 that may be utilized in the interactive response system 8. As shown, the vehicle 30 includes the vehicle computing system 50 with the processor 52, the memory 54, and the communication device 56. The vehicle computing system 50 may also include or be communicatively coupled to the one or more speakers 60, the one or more microphones 62, the one or more display devices 64, the one or more sensors 68, and/or other devices (e.g., to receive inputs and/or to provide outputs). The vehicle 30 may provide visible and/or audible outputs to attract attention (e.g., promote itself as an assistance vehicle). For example, the vehicle 30 may provide visible outputs via displays, lights, and/or the adjustable exterior surface 70. Additionally or alternatively, the vehicle 30 may provide audible outputs via the one or more speakers 60.

As shown in FIG. 3, the vehicle 30 may include the adjustable exterior surface 70 that is configured to change appearance (e.g., color, text, shape). For example, in FIG. 3, the adjustable exterior surface 70 may be selected or change from a first color to a second color as a user 90 approaches the vehicle 30 and/or based on user information about the user 90 (e.g., provided by the user 90; accessed in the one or more databases). In some embodiments, the adjustable exterior surface 70 may change to the second color that is representative of an insurance provider or other provider (e.g., the banking institution) for the user 90, based on the user preferences of the user, and so forth. In this way, the vehicle 30 may include a customized or user-specific appearance (e.g., outer shell or skin) to provide familiarity to the user 90, among other advantages.

The vehicle 30 may also include components that are configured to provide imagery of an agent 92 (e.g., avatar with human or other form) within the vehicle 30. This may give the user 90 a more realistic interaction and experience for exchanging information about the event, requesting insurance coverage, requesting supplies, and so forth. In some cases, the imagery of the agent 92 may be selected (e.g., presented or changed) as the user 90 approaches the vehicle 30 and/or based on the user information about the user 90 (e.g., based on the user preferences, so as to present a particular avatar and/or the agent 92 with a particular likeness or representative of a particular person). In this way, the vehicle 30 may present a customized or user-specific agent to provide familiarity and/or positive emotions for the user 90, among other advantages.

In some embodiments, the imagery of the agent 92 may be presented for an initial period of time, such as while the user 90 approaches the vehicle 30, during certain introductory questions (e.g., to confirm name and address) and/or information exchange (e.g., to scan the code, to capture images of the user 90), and so forth. Then, the interactive response system 8 may replace the imagery of the agent 92 with a video stream (e.g., live in real-time or substantially real-time) of a human agent (e.g., representation of a provider). In such cases, the interactive response system 8 may select the human agent based on the user information about the user 90, which may include information obtained during the initial period of time. For example, the interactive response system 8 may select the human agent associated with an insurance provider for the user 90 (as opposed to another insurance provider), or the interactive response system 8 may select the human agent with experience in flood insurance based on statements from the user 90 that indicate that a residential building of the user 90 experienced flood damage during the event.

In some embodiments, the vehicle 30 may be configured to interact with multiple users, such as the user 90 and an additional user 100, simultaneously. In such cases, each of the users 90, 100 may experience respective customized interactions, including customized imagery of agents, customized communications (e.g., conversations), customized human agents, and so forth. The vehicle 30 may include multiple display devices 64 that face different directions, as well as directional speakers that project audio in particular, limited directions. Indeed, the multiple display devices 64 may include projectors that project imagery directly toward the users 90, 100 (e.g., onto retinas of the users 90, 100). In some cases, the vehicle 30 may carry headsets (e.g., head-mounted displays and/or speakers and/or microphones) that the users 90, 100 may wear to interact with the interactive response system 8. The headsets may have a wired or a wireless connection to the vehicle computing system 50 to carry out the techniques disclosed herein.

In some embodiments, the vehicle 30 may represent a group of providers (e.g., multiple insurance providers; multiple banking institutions; one or more insurance providers and one or more banking institutions). The adjustable exterior surface 70, as well as certain other features (e.g., the agents), may enable transformation of the vehicle 30 based on which of the users 90, 100 is currently approaching and/or interacting with the vehicle 30. For example, the adjustable exterior surface 70 may be the first color with a first logo for the user 90 (e.g., to represent a first insurance provider), and the adjustable exterior surface 70 may be the second color with a second logo for the additional user 100. In some cases, the adjustable exterior surface 70 may be configured to represent multiple colors and logos simultaneously (e.g., the first color with the first logo on a left side of the vehicle 30 and the second color with the second logo on a right side of the vehicle 30).

It should be appreciated that each vehicle 30 in a fleet or team of vehicles (e.g., the one or more vehicles 30 of FIG. 1) may represent one or more providers. Further, one or more additional structures 102, such as tents, permanent buildings, and/or temporary buildings, may be part of the interactive response system 8 and may include any features disclosed herein. For example, the vehicle 30 may carry and/or deploy the one or more additional structures 102 in the geographic area. The one or more additional structures 102 may include speakers, microphones, displays, projectors, adjustable exterior surfaces and/or interior surfaces, and so forth to provide customized, user-specific experiences. For example, if the user 90 approaches or enters a particular additional structure 102 to receive medication and/or medical care, the particular additional structure 102 may be transformed via projection and/or display of imagery (e.g., on exterior and/or interior walls) to have an appearance of a medical clinic or a pharmacy. In some cases, the interactive response system 8 may coordinate operation of the vehicle 30 and the particular additional structure 102 to initiate the transformation of the particular additional structure 102 or to otherwise confirm that a current appearance of the particular additional structure 102 is appropriate. For example, the interactive response system 8 may determine and record that the user 90 may benefit from medications that are available in a storage container in the particular additional structure 102. The interactive response system 8 may communicate the availability of the medications to the user 90, such as via the interaction at the vehicle 30. Then, the interactive response system 8 may detect the presence of the user 90 at the particular additional structure 102 and release or dispense the medications to the user 90 at that time.

Figure 4:
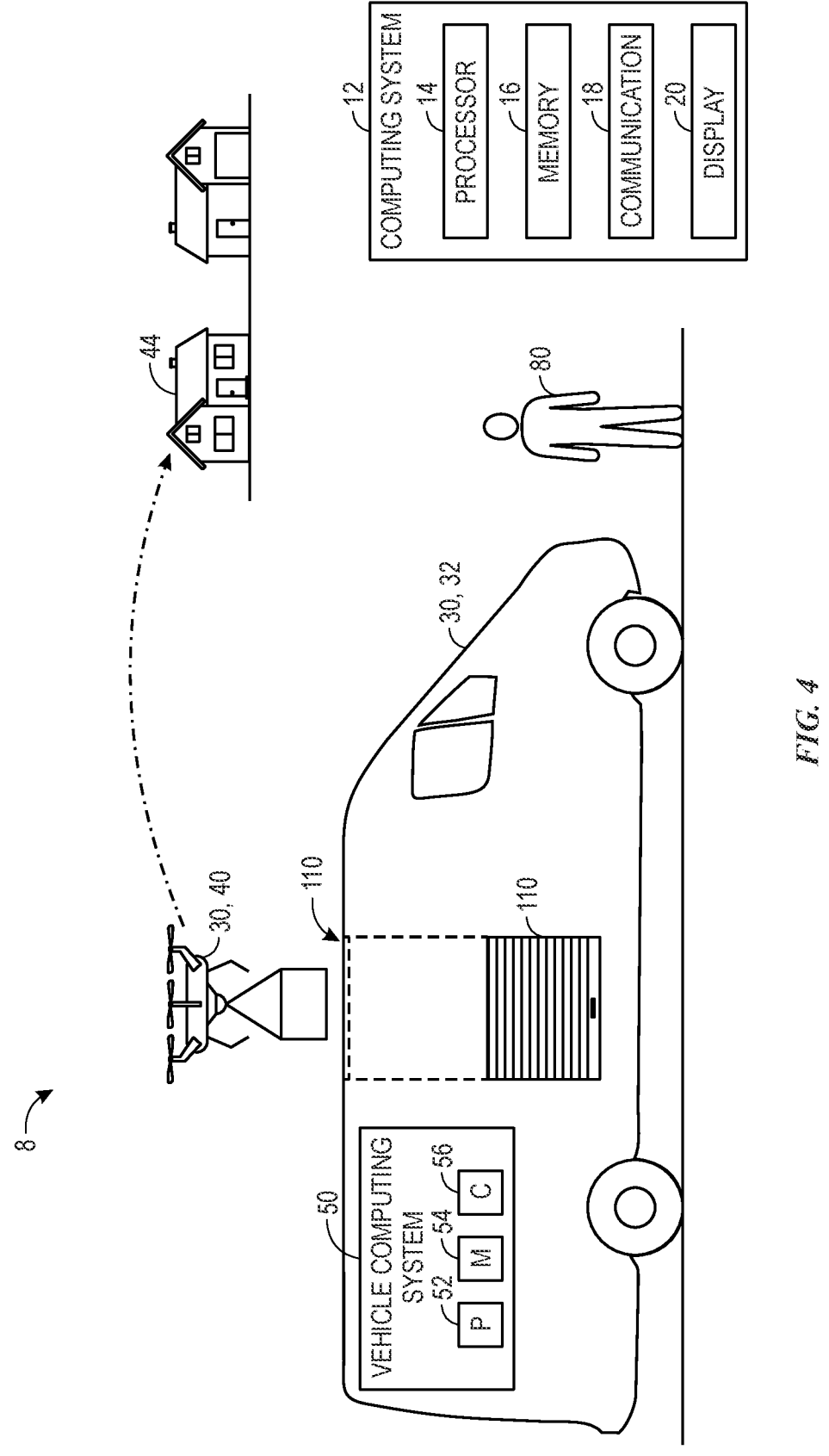
FIG. 4 illustrates one or more response vehicles that may be utilized to distribute supplies as part of the interactive response system of FIG. 1, in accordance with embodiments described herein.

FIG. 4 illustrates an embodiment of the interactive response system 8, wherein the one or more vehicles 30 may be utilized to distribute supplies. As shown, the one or more vehicles 30 may include one or more ground vehicles, such as the first vehicle 32, and one or more aerial vehicles, such as the fifth vehicle 40. In such cases, the first vehicle 32 and the fifth vehicle 40 may operate in a coordinated manner to distribute the supplies. For example, the first vehicle 32 may include one or more storage containers 110 that store the supplies (e.g., each storage container may store a respective type of supplies or respective supplies for each user expected or known to be present in the geographic area). The first vehicle 32 may also be configured to dispense the supplies from the one or more storage containers 110 directly to a user, such as the user 80. For example, the vehicle computing system 50 of the first vehicle 32 may instruct an actuator to open a door of a particular one of the one or more storage containers 110 to enable the user 80 to access the supplies. The vehicle computing system 50 of the first vehicle 32 may determine and/or select the door to open based on the user information and/or other information obtained during the interaction with the user 80.

Additionally or alternatively, the first vehicle 32 and the fifth vehicle 40 may work together to distribute the supplies. For example, the vehicle computing system 50 of the first vehicle 32 may instruct the actuator to open the door of the particular one of the one or more storage containers 110 to enable the fifth vehicle 40 to access the supplies. Then, the fifth vehicle 40 may carry the supplies to a designated location (e.g., according to a route, such as a flight plan). The designated location may be one of the structures 44 in the geographic area, such as a residence of the user 80 in the geographic area or a supply distribution region of the geographic area (e.g., where the users wait for delivery of the supplies). In this way, the interactive response system 8 may provide a base supply unit (e.g., a larger vehicle and/or a ground vehicle, such as the first vehicle 32) and a delivery unit (e.g., a smaller vehicle and/or an aerial vehicle, such as the fifth vehicle 40).

In some embodiments, medications and/or other supplies for the geographic area may be determined prior to transfer of the first vehicle 32 to the geographic area (e.g., medical needs are pre-assessed and used to populate the base supply unit). In this way, appropriate medications and/or other supplies can be stored on and carried by the first vehicle 32 to the geographic area. For example, in response to the occurrence of the event (e.g., or at some other time, such as prior to the event based on predictions and/or forecasts), the interactive response system 8 may access the user information for the user 80 and/or any other users associated with the geographic area (e.g., residing in the geographic area, registered to the geographic area, and/or with last known locations in the geographic area based on location information from respective user devices). The interactive response system 8 may use this information to select and to store the appropriate medications and/or the other supplies on the first vehicle 32 (e.g., the database may indicate that the user 80 takes a particular medication every day and that the user 80 resides in the geographic area, and thus, the particular medication may be loaded on the first vehicle 32).

It should be appreciated that, in some cases, the user 80 may not be able to travel to the first vehicle 32 due to road conditions and/or various other factors. In such cases, the fifth vehicle 40 (e.g., aerial vehicle) may be instructed to travel to the user 80 and to carry out the interactions with the user 80 (e.g., to provide information to the user 80, to gather information from the user 80). Indeed, the fifth vehicle 40 may be configured to include any of the components of the one or more vehicles 30 and/or to carry out any of the techniques for interactive responses as described herein. For example, the fifth vehicle 40 may employ facial recognition and/or scan codes to identify the user 80, carry out AI-driven communications with the user 80, and so forth. Thus, the fifth vehicle 40 may distribute the supplies to the user 80 and/or carry out the interactions with the user 80. The supplies may include food items, clothing items, medications, medical items, home repair items, communication devices (e.g., satellite phones, short-range or local communication devices), and so forth.

As noted herein, in some cases, communication capabilities may be limited in the geographic area. Thus, it may be desirable for at least one of the one or more vehicles 30 to operate as a central hub within the geographic area (e.g., provide at least some of the functions of the computing system 12 within the geographic area). For example, the first vehicle 32 may operate as the central hub and may access the user information for the user 80 and/or any other users associated with the geographic area while the first vehicle 32 is communicatively coupled to the one or more databases that store the user information (e.g., while the first vehicle 32 is outside of the geographic area). Then, the first vehicle 32 may travel into the geographic area, may communicate the user information to the other vehicles 30, and/or use the user information to carry out the interactions with the users and/or to deliver supplies to the user 80 and/or other users.

In such cases, the first vehicle 32 may also serve as a temporary data store for additional information obtained by the first vehicle 32 and/or the other vehicles 30 in the geographic area. For example, if the user 80 reports to the fifth vehicle 40 that there is flood damage at the residence of the user 80, the fifth vehicle 40 may communicate this to the first vehicle 32, and the first vehicle 32 may communicate this back to the computing system 12 once communications with the computing system 12 are restored (e.g., after the first vehicle 32 exits the geographic area). In this way, the one or more vehicles 30 may operate to interact with the users in the geographic area without outside communications (e.g., to the computing system 12 via the Internet).

As described herein, the one or more vehicles 30 may participate in the interactive response system 8 (e.g., travel to and/or throughout the geographic area, interact with the users, and/or deliver the supplies) while unoccupied and/or without human intervention (e.g., driving autonomously). However, it should be appreciated that the one or more vehicles 30 may participate in the interactive response system 8 while occupied and/or with human intervention (e.g., driving under control of a driver). Additionally or alternatively, any aerial vehicles may be carried to the geographic area by ground vehicles (or vice versa, any ground vehicles may be carried to the geographic area by aerial vehicles). Further, the one or more vehicles 30 may operate in any of a variety of ways and/or configurations. For example, any aerial vehicles may be employed as the central hub, as the base supply unit, to acquire and/or carry supplies into the geographic area to stock the base supply unit, and so forth.

Figure 5:
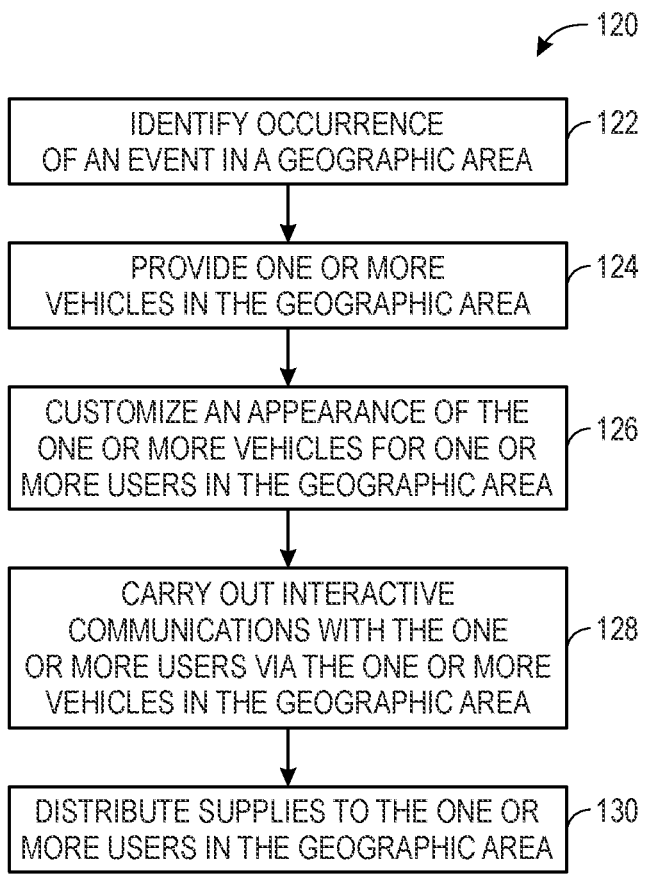
FIG. 5 is a flow chart of a process of operating an interactive response system for a geographic area, in accordance with embodiments described herein.

FIG. 5 is a flow chart of a process 120 for operating an interactive response system, such as the interactive response system 8 of FIGS. 1-4, in accordance with embodiments described herein. The following description of the process 120 will be described as being performed by one or more processors, such as the processor(s) of the one or more vehicles and/or the processor(s) of the computing system of FIGS. 1-4. However, it should be noted that any suitable processor-based device may be specially programmed to perform any of the steps of the process 120 described herein. Moreover, although the following description of the process 120 is described in a particular order, it should be understood that the steps of the process 120 may be performed in any suitable order, certain steps of the process 120 may be omitted, and other steps may be added to the process 120.

The process 120 may begin with identifying occurrence of an event in a geographic area (block 122). For example, the one or more processors may receive an indication of the occurrence of the event in the geographic area from any of a variety of sources, such as data from one or more sensors in the geographic area, data from one or more user devices (e.g., input by users), data from one or more external data sources (e.g., weather reports, news reports, social media), and so forth. In some embodiments, the one or more processors may define parameters of or a boundary about the geographic area.

The process 120 may continue with providing one or more vehicles to and/or within the geographic area (block 124). For example, the one or more processors may instruct the one or more vehicles to travel (e.g., autonomously travel) to particular locations (e.g., coordinates) in the geographic area. The one or more vehicles may include one or more vehicles owned by or otherwise associated with respective users (e.g., individual users; residents of the geographic area). Additionally or alternatively, the one or more vehicles may include one or more vehicles owned by or otherwise associated with a provider(s) (e.g., emergency response crew(s), insurance provider(s), banking institution(s)). In some embodiments, the one or more vehicles 30 may include some or all of the vehicles (e.g., autonomous vehicles; vehicles with interactive features) present in and/or nearby the geographic area during the occurrence of the event in the geographic area. In some embodiments, the one or more vehicles may include all vehicles that qualify for participation in the interactive response system, such as all vehicles that are registered with the provider(s), all vehicles that are owned by or otherwise associated with the provider(s), all autonomous vehicles, and/or all vehicles with interactive features.

The process 120 may continue with customizing an appearance of the one or more vehicles for one or more users in the geographic area (block 126). For example, some or all of the one or more vehicles may include an adjustable exterior surface, which may be configured to change appearance (e.g., color, text, shape). In some embodiments, the adjustable exterior surface may include a screen that is backlit via one or more projectors and/or the adjustable exterior surface may include one or more display screens that display imagery. In some embodiments, the adjustable exterior surface may include color-changing paint, adjustable structures, and so forth. Additionally or alternatively, customizing the appearance of the one or more vehicles may include providing imagery of an agent (e.g., avatar with human or other form) within some or all of the one or more vehicles. In some cases, the imagery of the agent may be selected (e.g., presented or changed) for each particular user (e.g., based on the user information).

The process 120 may continue with carrying out interactive communications with the one or more users via the one or more vehicles in the geographic area (block 128). For example, as the particular user approaches one of the one or more vehicles, a sensor may capture images of the particular user and then transmit the images of the particular user to the one or more processors. The one or more processors may process the images (e.g., facial recognition techniques) to identify the particular user. Then, the one or more processors may access user information for the particular user in one or more databases. For example, the user information may include a name, an address, an insurance provider, an insurance policy, a banking institution, an account balance of a bank account, preferences of the particular user, medications taken by the particular user, and/or other characteristics for the particular user. The user information may also link to household members associated with the particular user, as well as respective information for the household members. In some embodiments, the one or more processors may obtain the user information via other techniques and/or intermediate devices, including via communication with a user device of the particular user (e.g., to access a code or other unique identifier that can then be utilized to look up the user information in the one or more databases).

The process 120 may utilize the user information to facilitate interactions with the particular user. For example, the one or more processors may instruct components of the one vehicle of the one or more vehicle to provide information (e.g., about the event, available resources) to the particular user via one or more speakers and/or one or more display devices. The one or more processors may receive information (e.g., about the event, needed supplies) from the particular user via one or more microphones and/or via inputs on the one or more display devices. In some embodiments, the one or more processors may utilize AI to assess behavior of the particular user and/or needs of the particular user, as well as to control outputs to interact with the particular user. Further, the one or more processors utilize AI to carry out a conversational interaction (e.g., to emulate a natural conversation between two humans) with the particular user. The one or more processors may utilize the user information, including additional user information obtained via the interaction with the particular user, to pre-populate forms, initiate insurance claims, initiate requests for supplies, and so forth.

The process 120 may continue with distributing supplies to the one or more users within the geographic area (block 130). The one or more vehicles may include one or more ground vehicle and/or one or more aerial vehicles. In some such cases, the one or more ground vehicles may work together with the one or more aerial vehicles to distribute the supplies. For example, one of the one or more ground vehicles may include one or more storage containers that store the supplies. The one of the one or more ground vehicles may be configured to dispense the supplies from the one or more storage containers directly to the particular user. Additionally or alternatively, the one of the one or more ground vehicles may be configured to enable one of the one or more aerial vehicles to access the supplies. Then, the one of the one or more aerial vehicles may carry the supplies to a designated location. The designated location may be one of the buildings in the geographic area, such as a residence of the particular user in the geographic area or a supply distribution region of the geographic area. In some embodiments, medications and/or other supplies for the geographic area may be determined prior to transfer of the supplies to the geographic area (e.g., medical needs are pre-assessed and used to populate a base supply unit). In this way, appropriate medications and/or other supplies can be stored on and carried by the one or more vehicles to the geographic area. The supplies may include food items, clothing items, medications, medical items, home repair items, communication devices (e.g., satellite phones, short-range or local communication devices), and so forth.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. It should be appreciated that any of the features shown or described herein, such as with reference to FIGS. 1-5, may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive response system, comprising:
a computing system comprising one or more processors, wherein the computing system is configured to:
identify occurrence of an event in a geographic area;
in response to identifying the occurrence of the event in the geographic area:
instruct one or more vehicles to travel to a location in the geographic area;
operate one or more speakers and one or more microphones on the one or more vehicles to carry out interactive communications with one or more users in the geographic area;
identify a presence of a first user of the one or more users at a first vehicle of the one or more vehicles;
receive user information about the first user of the one or more users;
select imagery representative of an agent based on the user information; and instruct a display device on the first vehicle to present the imagery representative of the agent during the interactive communications.

2. The interactive response system of claim 1, wherein the computing system is configured to instruct the one or more vehicles to autonomously travel to the location in the geographic area.

3. The interactive response system of claim 1, wherein the user information comprises agent preferences of the first user.

4. The interactive response system of claim 1, wherein the computing system is configured to:
receive an image of the first user from a sensor on the first vehicle;
process the image to identify the presence of the first user and an identity of the first user via image analysis; and
access the user information in one or more databases using the identity of the first user.

5. The interactive response system of claim 1, wherein the computing system is configured to:
receive a unique identifier from a user device carried by the first user; and
access the user information in one or more databases using the unique identifier.

6. The interactive response system of claim 1, wherein the computing system is configured to initiate adjustment to an adjustable exterior surface of the first vehicle based on the user information.

7. The interactive response system of claim 6, wherein the user information comprises an insurance provider for the user, and the adjustment to the adjustable exterior surface comprises a change to a color of the adjustable exterior surface of the first vehicle, a logo visible on the adjustable exterior surface of the first vehicle, or both.

8. The interactive response system of claim 1, wherein the computing system is configured to instruct the one or more vehicles to dispense supplies at the location in the geographic area.

9. An interactive response system, comprising:
a computing system comprising one or more processors, wherein the computing system is configured to:
instruct a first vehicle and a second vehicle to travel to a geographic area in response to an event;
instruct the first vehicle to request information from a first user in the geographic area; and
instruct the second vehicle to deliver supplies to the first user in the geographic area based on the information.

10. The interactive response system of claim 9, wherein the first vehicle is a ground vehicle, and the second vehicle is an aerial vehicle.

11. The interactive response system of claim 9, wherein the computing system is configured to operate a display device on the first vehicle to present imagery representative of an agent.

12. The interactive response system of claim 9, wherein the computing system is configured to:
identify a presence of the first user at the first vehicle; and
in response to identifying the presence of the first user at the first vehicle, instruct the first vehicle to operate one or more speakers, one or more display devices, or both to initiate the request for the information from the first user.

13. The interactive response system of claim 9, wherein the computing system is configured to initiate adjustment to a respective adjustable exterior surface of the first vehicle, a respective adjustable exterior surface of the second vehicle, or both based on the information.

14. A method of operating an interactive response system, the method comprising:

identifying, with one or more processors, occurrence of an event in a geographic area;

in response to identifying the occurrence of the event in the geographic area:

instructing, using the one or more processors, one or more vehicles to travel to a location in the geographic area;

operating, using the one or more processors, one or more speakers and one or more microphones on the one or more vehicles to carry out interactive communications with one or more users in the geographic area;

receiving, at the one or more processors, a unique identifier from a user device carried by a first user of the one or more users;

accessing, using the one or more processors, user information for the first user in one or more databases using the unique identifier; and instructing, using the one or more processors, a change to an appearance of at least one vehicle of the one or more vehicles based on the user information.

15. The method of claim 14, comprising instructing, using the one or more processors, a display device on the one or more vehicles to present imagery representative of an agent during the interactive communications.

16. The method of claim 14, comprising instructing, using the one or more processors, the one or more vehicles to dispense supplies at the location in the geographic area.

17. The method of claim 16, comprising:

instructing, using the one or more processors, a first vehicle of the one or more vehicles to carry out the interactive communications with the one or more users in the geographic area; and instructing, using the one or more processors, a second vehicle of the one or more vehicles to dispense the supplies at the location in the geographic area based on the interactive communications.

18. The interactive response system of claim 1, wherein the computing system is configured to:

identify a respective presence of a second user of the one or more users at a second vehicle of the one or more vehicles;

receive respective user information about the second user of the one or more users;

select respective imagery representative of an additional agent based on the respective user information about the second user; and instruct an additional display device on the second vehicle of the one or more vehicles to present the respective imagery representative of the additional agent during the interactive communications.

19. The interactive response system of claim 9, wherein the computing system is configured to:

identify a respective feature of the first vehicle;

identify a respective feature of the second vehicle;

select the first vehicle to request the information from the first user in the geographic area based on the respective feature of the first vehicle; and select the second vehicle to deliver the supplies to the first user in the geographic area based on the respective feature of the second vehicle, wherein the supplies are based on the information.

20. The interactive response system of claim 9, wherein the event comprises a weather event, a vehicle crash event, a crime event, or any combination thereof.

*     *     *     *     *